June 27, 1944. C. E. MARK 2,352,397
DRAFT HITCH
Filed May 24, 1943
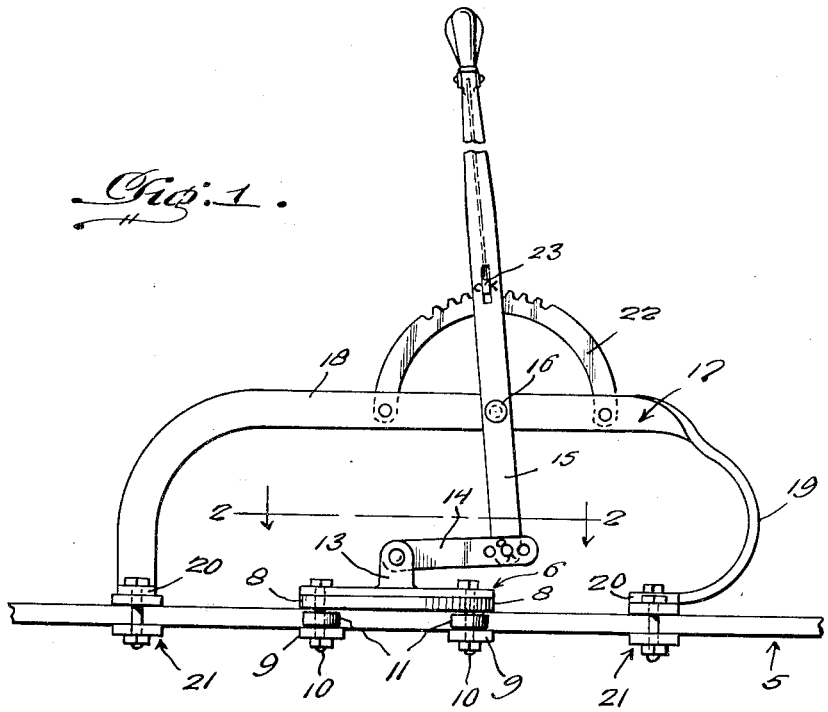
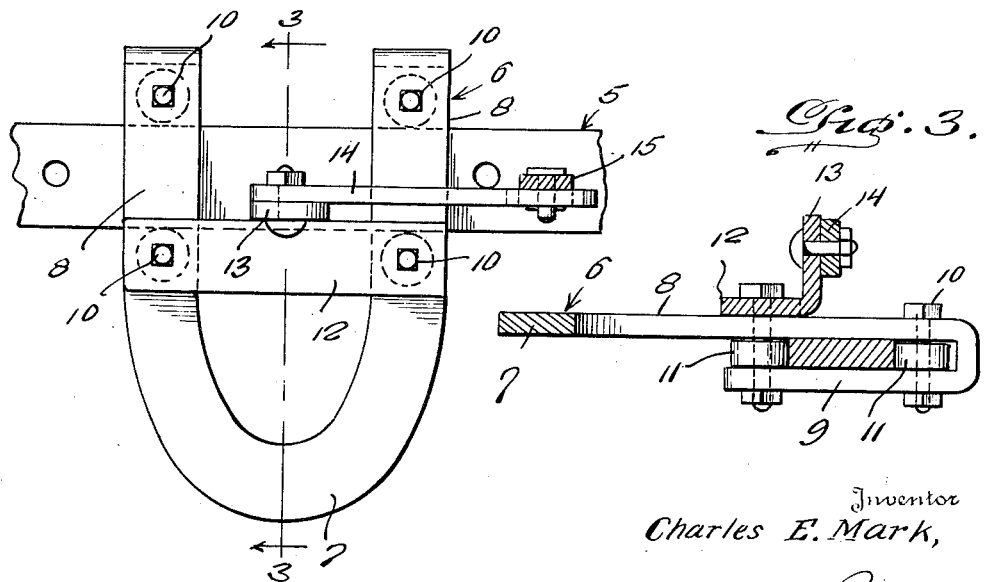
Inventor
Charles E. Mark,
By McMorrow and Berman
Attorneys Patented June 27, 1944

2,352,397

UNITED STATES PATENT OFFICE 2,352,397

DRAFT HITCH

Charles E. Mark, Barryton, Mich.

Application May 24, 1943, Serial No. 488,246

3 Claims. (Cl. 280—33.10)

This invention relates to a draft hitch for an agricultural implement or similar device for coupling the latter to a prime mover, such as a tractor, and has for the primary object the provision of a device of this character which will reduce to a minimum side slipping of the towed implement relative to the prime mover when operating on a hillside, resulting in, when plowing or otherwise acting on the soil with the implement, the forming of full width furrows free from furrows merging or running into each other and also permit action on the soil to be carried out closer to obstructions, fences or the like than can be accomplished with a draft hitch of the conventional construction.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which Figure 1 is a fragmentary rear elevation illustrating a draft hitch constructed in accordance with my invention.

Figure 2 is a sectional view taken on the line 2—2 of Figure 1.

Figure 3 is a sectional view taken on the line 3—3 of Figure 2.

Referring in detail to the drawing, the numeral 5 indicates a draft or draw bar of a prime mover such as a tractor. The bar 5 is secured to and arranged transversely of the prime mover at the rear end thereof. The purpose of the bar is to permit different kinds of devices to be coupled onto the prime mover.

The bar 5 is employed for adapting the present invention to the prime mover and has slidably mounted thereon a clevis or yoke 6 to which an implement may be connected in the usual way. The yoke or clevis is of substantially U shape defining a bight portion 7 and parallel arms 8. Said arms are bent upon themselves to form hook shaped portions 9. The bar 5 is slidably received between the arms 8 and the hook shaped portions 9, as shown in Figure 3, and bolts extend through the arms 8 and hook shaped portions 9 at opposite edges of the bar and have journaled thereon anti-friction rollers 11 which ride against the bar for the purpose of permitting the yoke or clevis to slide on the bar with a minimum amount of friction. The arms 8 adjacent the bight portion and the bar 5 are connected by a plate 12 having an upstanding ear 13 to which a link 14 is pivoted.

The link is pivotally and adjustably connected to the lower end of an operating lever 15 pivotally mounted, as at 16, on a frame 17. By the pivotal movement of the lever 15 in opposite directions the yoke or clevis 6 will be caused to slide in opposite directions on the bar 5 and thereby shift the towed implement laterally of the prime mover in either direction of the longitudinal axis of said prime mover.

The frame 17 includes a bar 18 arranged in a plane above the draft bar 5 and is provided with substantially arcuately curved end portions 19 extending in the direction of the bar 5 and provided with laterally extending feet 20 secured on the bar 5 by clamps or similar fasteners 21, permitting the frame 17 to be readily adjusted endwise of the bar 5 in either direction thereby varying the location of the entire draft hitch on the bar 5.

A segmental shaped rack 22 is mounted on the bar 18 of the frame 17 to coact with a detent 23 carried by the control lever 15 whereby the latter may be releasably secured in any of its adjusted positions which results in securing the clevis or yoke 6 in any of its adjusted positions endwise of the bar 5.

When the device has been adapted to a prime mover, the control lever 15 is located rearwardly of and in close proximity to the operator's seat of the prime mover so that the operator can at any time shift the yoke or clevis endwise of the bar 5, and thereby adjust the towed implement laterally of the prime mover in either direction for the purpose of preventing side slipping of the implement on a hillside which would result in merging of the furrows formed by the implement.

With the use of this device under direct control of the operator, the implement when operating on a hillside can be made to form furrows of full width and permits operation of the implement in close vicinity to obstructions, fences, and the like.

Further, the device will be very beneficial when used in connection with towed devices that are to be backed up by the prime mover as the backing up operation can be more easily carried out when the towed device can be shifted laterally of the prime mover in either direction.

While I have shown and described the preferred embodiment of my invention, it will be understood that minor changes in construction, combination and arrangement of parts may be made without departing from the spirit and scope of the invention as claimed.

Having thus described my invention, what I claim is:

1. In a draft hitch, a draw bar extending transversely of and secured to a prime mover, an implement connecting yoke of substantially U shape providing a bight portion and parallel arms bent upon themselves to form hook shaped portions coacting with the arms in slidably receiving the bar with the arms disposed over the bar, antifriction rollers carried by the hook shaped portions and arms and engaging the bar at opposite edges of the latter, a plate connecting the arms and overlying the latter, a link pivoted to said plate, and an operating means connected to the link and mounted on the bar beyond the limit of the sliding movement of the yoke on said bar.

2. In a draft hitch, a draw bar extending transversely of and secured to a prime mover, an implement connecting yoke of substantially U shape providing a bight portion and parallel arms bent upon themselves to form hook shaped portions coacting with the arms in slidably receiving the bar, antifriction rollers carried by the hook shaped portions and arms and engaging the bar, a plate connecting the arms, a link pivoted to said plate, a frame adjustably and detachably connected to the bar, and a control lever carried by said frame and connected to the link.

3. In a draft hitch, a draw bar extending transversely of and secured to a prime mover, an implement connecting yoke of substantially U shape providing a bight portion and parallel arms bent upon themselves to form hook shaped portions coacting with the arms in slidably receiving the bar, antifriction rollers carried by the hook shaped portions and arms and engaging the bar, a plate connecting the arms, a link pivoted to said plate, a frame adjustably and detachably connected to the bar, a control lever pivoted to the frame and pivotally and adjustably connected to the link and including a detent, and a rack carried by the frame to cooperate with the detent.

CHARLES E. MARK.